(12) United States Patent
Gulgné et al.

(10) Patent No.: US 8,400,872 B2
(45) Date of Patent: Mar. 19, 2013

(54) SEISMIC SOURCE WHICH INCORPORATES EARTH COUPLING AS PART OF THE TRANSMITTER RESONANCE

(75) Inventors: Jacques Y. Gulgné, Paradise (CA); Nicholas G. Pace, Bath (GB); James A. Wright, St. John's (CA); Richard Wright, legal representative, St. John's (CA); Gary J. Dinn, Paradise (CA)

(73) Assignee: Acoustic Zoom, Inc., Paradise, NL (CA)

( * ) Notice: Subject to any disclaimer, the term of this patent is extended or adjusted under 35 U.S.C. 154(b) by 282 days.

(21) Appl. No.: 12/885,660

(22) Filed: Sep. 20, 2010

(65) Prior Publication Data
US 2011/0075520 A1 Mar. 31, 2011

Related U.S. Application Data

(60) Provisional application No. 61/245,707, filed on Sep. 25, 2009.

(51) Int. Cl.
*G01V 1/40* (2006.01)
(52) U.S. Cl. ............... 367/25; 181/102; 181/106; 175/1
(58) Field of Classification Search .................. 367/25, 367/83, 162, 176; 181/106, 113, 402; 175/1, 175/40
See application file for complete search history.

(56) References Cited

U.S. PATENT DOCUMENTS

| | | | |
|---|---|---|---|
| 3,860,902 A | 1/1975 | Galle | |
| 4,033,429 A | 7/1977 | Farr | |
| 4,671,379 A * | 6/1987 | Kennedy et al. | 181/106 |
| 4,890,687 A * | 1/1990 | Medlin et al. | 181/106 |
| 5,283,768 A * | 2/1994 | Rorden | 367/83 |
| 6,366,536 B1 | 4/2002 | Vallieres et al. | |
| 6,545,949 B1 * | 4/2003 | Franklin | 367/176 |
| 6,567,342 B1 * | 5/2003 | Purcell et al. | 367/176 |

OTHER PUBLICATIONS

International Search Report and Written Opinion—PCT application No. PCT/CA2010/001527.
Legall et al., A 300 Hz Janus-Helmholtz transducer for ocean acoustic tomography, IEEE 1993, ISBN 0-7803-1385-2, pp. 1-278 to 1-281.
Morozov, A.K., and Webb, D.C. IEEE Journal of Oceanic Engineering, vol. 28, No. 2, Apr. 2003, pp. 174-185, "A Sound Projector for Acoustic Tomography and Global Ocean Monitoring".

* cited by examiner

*Primary Examiner* — Ian Lobo
(74) *Attorney, Agent, or Firm* — Richard A. Fagin

(57) ABSTRACT

An acoustic energy source for imparting acoustic energy into the Earth's subsurface includes an electrically driven transducer coupled to a source of swept frequency alternating current. A tunable Helmholtz resonator is disposed proximate the transducer. In one example, the resonator has a tuning device configured to maintain a resonant frequency substantially equal to an instantaneous frequency of the alternating current. The tuning device includes an actuator coupled to a sleeve, wherein the sleeve is disposed over selected numbers of openings in a wall of a tube on the resonator. The transducer and the resonator are disposed in a wellbore drilled through rock formations. The wellbore has a plurality of layers of fluid therein, each layer thereof having a different density and/or viscosity.

10 Claims, 1 Drawing Sheet

SEISMIC SOURCE WHICH INCORPORATES EARTH COUPLING AS PART OF THE TRANSMITTER RESONANCE

CROSS-REFERENCE TO RELATED APPLICATIONS

Priority is claimed from U.S. Provisional Application No. 61/245,707 filed on Sep. 25, 2009

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic exploration of subsurface rock formations. More specifically, the invention relates to seismic energy sources used to illuminate the subsurface rock formations for seismic evaluation thereof.

2. Background Art

Seismic exploration of subsurface rock formations includes so called "controlled source" or "active source" exploration, wherein one or more seismic energy sources are deployed above an area of the subsurface to be evaluated. The deployment may be near the land surface for land based surveys or in the water or on the water bottom for marine surveys. The sources are energized, and energy reflected from subsurface acoustic impedance boundaries and other features (such as diffractors) is detected by a plurality of seismic sensors deployed near the source. Recordings of the detected seismic energy are analyzed to determine various properties of the subsurface formations, for example, their geologic structure, mineral composition and/or fluid content.

The important requirements of a land based seismic energy source are that it has a high source output level, the capability to perform precisely reproducible frequency sweeps which can be recovered (e.g., by cross-correlation) as short time domain signals, compactness, and good acoustic coupling to the earth. A particular problem encountered during transmitting acoustic energy into the subsurface as experienced in seismic exploration practices is relatively poor coupling of the source to the earth due to impedance mismatch between the air and the soil or ground conditions. The impedance mismatch limits the efficiency of the transmission of seismic energy into the ground within the near surface. Such contrasting earth conditions or properties from the energy generating atmosphere act as a barrier for energy to initially propagate across the air/earth interface and into the earth's subsurface. Typically only a small percentage of the generated energy coherently enters into the subsurface. In addition the signal consistency between different source actuations (from "shot to shot") can degrade in relation to the degree of soil inhomogeneity.

There exists a need for more efficient seismic energy sources with improved coupling and improved shot to shot coupling efficiency.

SUMMARY OF THE INVENTION

An acoustic energy source according to one aspect of the invention for imparting acoustic energy into the Earth's subsurface includes an electrically driven transducer coupled to a source of swept frequency alternating current. A tunable Helmholtz resonator is disposed proximate the transducer. In one embodiment, the resonator has a tuning device configured to maintain a resonant frequency substantially equal to an instantaneous frequency of the alternating current. The tuning device includes an actuator coupled to a sleeve, wherein the sleeve is disposed over selected numbers of openings in a wall of a tube on the resonator. In the source, the transducer and the resonator are disposed in a wellbore drilled through rock formations. The wellbore has a plurality of layers of fluid therein, each layer thereof having a different density and/or viscosity.

A method for imparting acoustic energy into subsurface formations according to another aspect of the invention includes applying swept frequency alternating current to a transducer acoustically coupled to a tunable resonator. A resonant frequency of the resonator is matched to the frequency of the alternating current at any time. Energy from the resonator is conducted into the subsurface by immersion thereof in a column of fluid having at least one of variable density and variable viscosity.

Other aspects and advantages of the invention will be apparent from the following description and the appended claims.

DETAILED DESCRIPTION

Figure 2:
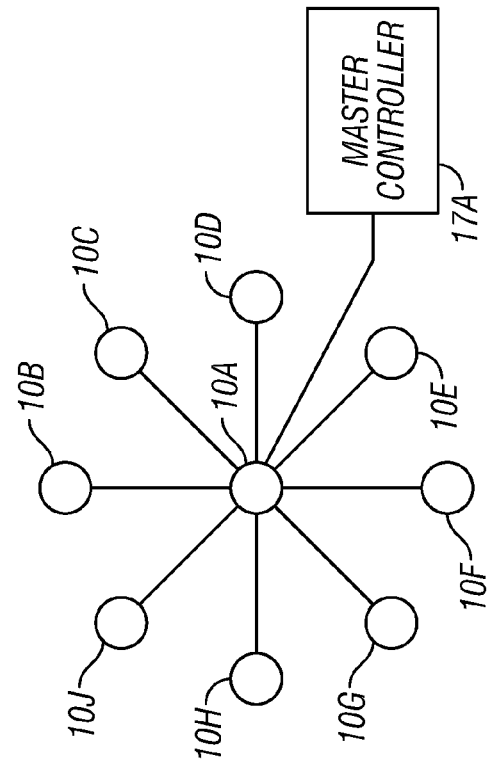
FIG. 2 shows an array of sources that may be used for beam steering source output.

The principle of the invention described herein includes an impedance matching medium to a mechanism of long resonator tubes that generate the sound. The foregoing structure can provide a better impedance match to the subsurface. The resonator tube or coupling waveguide is an integral part of the transmitter (source) design and of its resonance. This is particularly relevant when considering the difficulties in transmitting into the subsurface suitable high intensity signals of typically low frequencies (50 Hz to 300 Hz) generally associated with and targeted for seismic tomography mapping.

For an acoustic transducer to radiate power then for a given drive level the displacement amplitude of, for example, a piston or of the moving mechanism is determined by the radiation resistance. The radiation resistance for a piston of diameter greater than $\lambda/2\pi$ (wherein $\lambda$ is the energy wavelength) is approximately $\rho c A$, where A is the piston area and, $\rho$ is the density of the formations and c is the velocity of sound in the formations. As the frequency is reduced, the wavelength increases and the radiation resistance becomes reduced as the square of the frequency. To maintain power output either the displacement amplitude has to increase or the piston size must increase. There is a practical limit to the piston size, and for actuators such as piezoelectric drivers, a limit to the strains possible. One cannot control the radiation resistance except essentially by controlling the area of the radiating surface. Thus it is typically impractical to create singular transmitter sources with radiating surfaces which are comparable to a full energy wavelength. The low radiation resistance and mechanisms which can produce large displacements efficiently while constraints of operational coupling to the earth and subsequent propagation depth are difficult design attributes to meet. The present invention is intended to address the foregoing limitations.

One approach is to restrain the piezoelectric drivers so that their high stress is transformed into larger displacements by mechanical means. Such transducers are collectively known as flextensional. They have been designed within the band 300 Hz to 3000 Hz. They can provide appreciable power from a compact size, potentially up to high operating pressures. See, "Frequency, power and depth performance of class IV flextensional transducers", p 121-133, *Power Sonic and ultrasonic transducers design*, Ed B. Hamonic and J. N. Decarpigny, Springer 3-540-18664-6, (1987)

The foregoing reference describes and concludes that flextensional transducers are small, efficient, wide bandwidth, omnidirectional transmitters working in the frequency band around 1 kHz and suitable for use where high power is required. These transducers are typically only applicable to water based surveys (and in an ocean environment operation depths of less than 300 meter); hence they are of little practical use for land based seismic surveying.

A potentially suitable transducer approach may be found in various implementations of a Helmholtz resonator. A Helmholtz resonator typically consists of a rigid enclosed volume with a short neck. The outer end of the neck is open to the surrounding medium. The compliance of a fluid disposed in the enclosed volume can resonate with the mass of fluid in the neck to form the equivalent of a simple mass-spring system. A piezoelectric transducer, for example, a PZT transducer, may be disposed in the wall of the enclosed volume and can excite the resonance. See, for example, *Basic problems caused by depth and size constraints in low frequency underwater transducers*, R. S. Woolett, J. Acoust. Soc. Amer. 68, 1031-1037 (1980). The energy can be efficiently generated in air but the coupling to the ground remains an issue.

In a seismic energy source according to the various aspects of invention, the physics of using a piezoelectric driven Helmholtz resonator are used in a configuration to generate a low frequency, high power seismic source which is relatively insensitive to hydrostatic pressure. Such configuration may be obtained by using long a resonator tube and/or tubes, or "organ pipes" embedded in and operating in a fluid medium such as drilling mud. The drilling mud may be disposed in a suitable depth wellbore drilled from the surface (or water bottom). With features to enable adjustments in the resonant output frequency of the pipes, the pipes are made to operate so as to have better impedance coupling properties to the Earth, thus allowing for more predictable radiated low-frequency seismic energy to be imparted into the near subsurface, with higher efficiency gains over a range of resonant frequencies. Even while driven in the medium of drilling mud, the device can be operated over a broad band of frequencies by driving an electrical transducer with swept frequency alternating current near the transducers electrical limit (meaning all possible vibration modes are excited) which in turn will excite various frequency dependent modes. In addition it is well known in the art of tunable organ pipes that the range of radiated frequencies of the transducer could be accommodated by a suitably mechanically tunable, or a computer-controlled electrical actuator keeping the combination of tubes in resonance at any point in time with the frequency of the swept frequency AC driver signal used to drive the transducer. See, *A sound projector for acoustic tomography and global ocean monitoring*, A. K. Morozov, D. C. Webb, IEEE Oceanic Eng. 28, 174-185 (2003).

Figure 1:
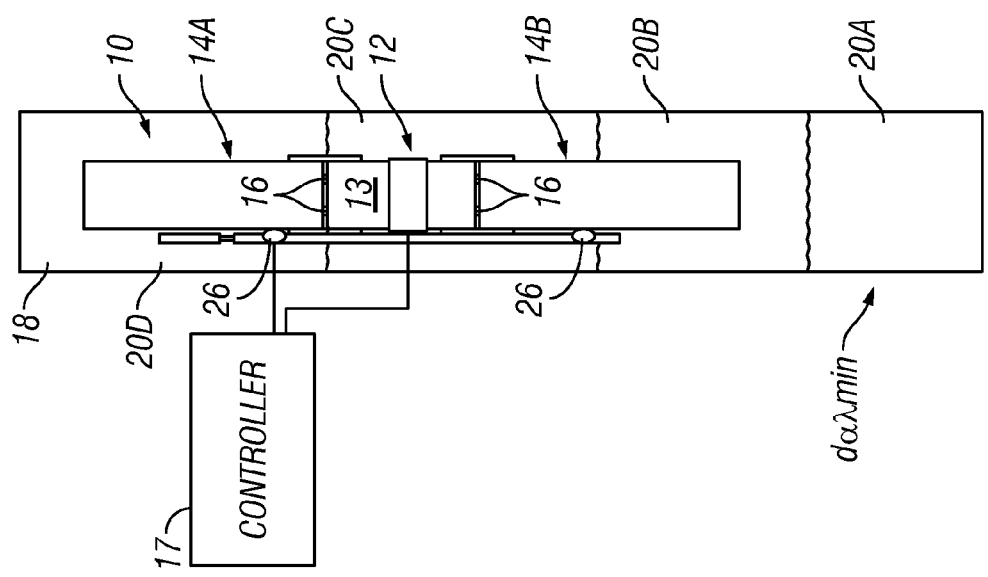
FIG. 1 shows an example seismic energy source according to the invention.

For example and as will be explained in more detail below with reference to FIG. 1, one implementation could include a resonant organ-pipe coupled to a transducer-type sound source. The transducer preferably has the ability to radiate swept-frequency signals with high efficiency, high power, and unlimited operating depth. Operating depth of the source would be unlimited by having the resonating pipe open to external hydrostatic pressure, having the pipe be mechanically tunable and using a Tonpilz acoustic driver. By using, for example, a computer-controlled electrical actuator (wherein the actuator controls numbers of slots in each tube that are exposed) the pipe or tube can be kept in resonance with the swept-frequency signal used to operate the transducer, and by means of phase-lock-loop feedback maintain such tuning to a high precision. Typically in this implementation, a configuration of two slotted resonator tubes driven by a coaxially mounted, symmetrical Tonpilz transducer are configured or embodied. As described in detail in the Morozov and Webb publication cited hereinabove, to change the resonant frequency of this type of resonator, the resonator tubes are fitted with slots located at a distance of about one-third the resonator tube length measured from the position of the transducer. Two, stiff coaxial tubular sleeves of larger diameter move axially along the exterior of the resonator tubes, changing the exposure length of the slots. This configuration, as known in the art relates to applications in a water medium where the inertia of the water layer in the gap between the two coaxial tubes depends on the position of the sleeves relative to the tube slots. As understood in the art, the position of the sleeves causes a change in the equivalent acoustic impedance of the slots, thus changing the resonant frequency of the resonator. As a result, the resonant frequency varies with the position of the sleeves relative to the slots. A computer controlled actuator may be used to move the sleeves and keep the resonator at a resonant frequency which matches the instantaneous frequency of the swept-frequency signal used to drive the acoustic transducer.

In a transmitter according to the invention, a high intensity source as explained above (or several similar sources in an array so steerable beams can be formed) can be physically coupled to the Earth by placement of the resonant tube (or in hybrid embodiments multiple resonating tubes in the same wellbore excited in parallel to form a singular source element) into a specifically dimensioned borehole filled with fluid of such as drilling mud. Generally, the borehole is one wavelength in depth of the longest wavelength to be generated. This is illustrated in FIG. 1. In the case of multiple resonating tubes the tubes would simply be attached together as a bundle and operated in parallel simultaneously through the same computer actuator control mechanism.

Briefly, a resonant tube sound source with a PZT or other electrical transducer with an interactive-controlled resonant frequency resonator can be used for radiating broadband swept frequency signals by maintaining the resonant frequency of the tube(s) in to be the same as the instantaneous signal frequency of the driver signal applied to the transducer. Efficiency of coupling the energy into the Earth can be improved by accommodating for the unique depth and spatial dimensions and densities and velocities of graded (variable density and/or viscosity) fluid in the wellbore. As mentioned earlier, prior organ pipe art relates to applications in a water medium. In the present invention water is replaced by a fluidized, graded density and/or viscosity fluid such as drilling mud disposed in the gap between the two coaxial sleeves that move over the tube slots, operating in a global resonance mode within the surrounding resonating chamber as formed or defined by the physical structure of the mud filled borehole. By changing the position of the sleeves relative to the tube slots a change in the equivalent acoustic impedance of the slots results, thus changing the resonant frequency. The fundamental change that occurs to the resonant frequency is a direct attribute to the properties used in the mud in step with the position of the sleeves relative to the slots. Unlike a typical organ pipe application, the present example of the invention would rely on some form of computer controlled actuator to move the sleeves in a manner that takes into account the dampening effects of the mud to keep the seismic source in resonance.

It will be appreciated by those skilled in the art that drilling mud is a convenient formulation of fluid to include in the wellbore because its density is easily selected by including various concentrations of density increasing material (e.g., barium sulfate) and viscosifiers to enable the density increasing material particles to remain suspended in the fluid. However, other dense fluids may be used in varying concentrations to provide the required density and/or viscosity grading of the fluid in the wellbore. Examples include potassium chloride, zinc bromide and barium chloride in various concentration aqueous solutions. Accordingly, drilling mud is not intended to be the only suitable fluid for use in the source wellbore.

The wellbore dimensions in which the resonator tube is situated are governed by the wavelength of the center frequency of interest such that constructive phasing occurs. If not positioned correctly and in phase, upward radiation may coincide with the forward energies and cancel. Unlike typical organ pipes operating in free field conditions, the device according to the invention is resonating energy constrained by the physical presence of the mud-containing borehole which collectively will behave as a large but interactive resonating chamber from which the output is coupled to the surrounding Earth in a predictable and reproducible manner.

The behavior of the energy that radiates outward from such a source can best be described as if originating from an effective point source which when combined with its image in the earth's surface results in constructive radiation in the vertically downward direction. To augment the efficiency and directional flow of energy downwardly into the earth, the mud filled borehole can be functionally graded at quarter wavelength intervals with mud of varying density, starting from the densest mud at the bottom, progressing up the borehole column ending with a lower viscosity and/or density mud. This in effect forms a graded fluid conductor to better match the impedances of the resonating borehole medium to the Earth, and although the resulting energy behaves as a point source, its direction of preferred flow is into the Earth because the matched coupling boundary has a relatively low reflection coefficient. Thus, the wellbore acts as a wave guide into the earth. The homogeneous compositional nature of the fluid in each layer, though graded, allows for the borehole to resonate in contrast with the surrounding Earth's generally inhomogeneous composition.

An example implementation operating on the principles described above is shown schematically in FIG. 1. The source 10 is shown disposed in a wellbore 18 drilled proximate the Earth's surface or the bottom of a body of water. The source 10 may be so disposed by wireline, slickline, pipe, coiled tubing or any other known manner of conveyance for wellbore devices. A total depth of the wellbore 18 as explained above may be selected based on the lowest frequency intended to be radiated into the subsurface formations below the wellbore 18. The wellbore 18 may be filled with stratified layers 20A, 20B, 20C, 20D of fluid, each having a unique density and/or viscosity so that acoustic energy at a plurality may be efficiently coupled into the formations below the wellbore 18. The thicknesses and numbers of fluid layers may be optimized for the particular frequency sweep range intended to be radiated from any example of the source 10.

The source 10 may include a piezoelectric or similar electric to acoustic transduction element (transducer) 12 The transducer 12 is coupled generally in the center of a Helmholtz resonator 13. The resonator 13 may include a generally tubular interior open to the wellbore fluids 20A-20D at both longitudinal ends, and include frequency tuning slots 16 about the central exterior. As explained above, the resonant frequency of the resonator 13 may be selected by exposing selected lengths of the slots 16. In the present example, such selective exposure may be performed by covering the exterior of the resonator 13 with impermeable tubes 14A, 14B at opposed longitudinal ends. The tubes 14A, 14B may be moved in longitudinally opposed directions by a linear actuator 26. The linear actuator 26 may be powered and controlled by a controller 17 such as a microprocessor based controller/driver combination. The controller 17 may also operate the transducer 12.

As explained above, the movement of the tubes 14A, 14B may be controlled by the controller 17 so that the resonant frequency of the resonator 13 can substantially match the instantaneous frequency of current applied by the controller 17 to the transducer 12. Typically, such frequency will be within a selected sweep range having a selected sweep cycle duration.

Also as previously explained above, and with reference to FIG. 2, a plurality or array of sources 10A-10J which may be configured substantially as explained with reference to FIG. 1 may be arranged in a selected pattern near the Earth's surface or water bottom. It is expected that each of the plurality of sources 10A-10J will be disposed in a corresponding wellbore (not shown in FIG. 2), each of which may be filled with stratified fluids as explained with reference to FIG. 1. A master controller 17A may either control operation of the individual controllers (17 in FIG. 1) of each source 10A-10J or may operate all of the sources. The configuration shown in FIG. 2 may be operated by the master controller 17A such that each of the sources 10A-10J may be energized through its respective frequency sweep with a time delay respective to the other sources 10A-10J to beam steer the output of the combination of all the sources 10A-10J to a selected zone or point in the subsurface.

A seismic energy source and arrays of such sources according to the various aspects of the invention may include high energy output and efficient acoustic coupling of the energy output of the source to the rock formations below the Earth's surface or the bottom of a body of water. Such high output and efficient acoustic coupling may improve the quality of seismic data obtained from the subsurface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An acoustic energy source for imparting acoustic energy into the Earth's subsurface, comprising:
   an electrically driven transducer coupled to a source of swept frequency alternating current;
   a tunable Helmholtz resonator disposed proximate and acoustically coupled to the transducer; and
   the transducer and the resonator disposed in a wellbore drilled through rock formations, the wellbore having a plurality of layers of fluid therein, each layer having at least one of a different density and viscosity than the other layers.

2. The source of claim 1 wherein the at least one of density and viscosity increases with respect to depth in the wellbore.

3. The source of claim 1 wherein the transducer comprises a piezoelectric element.

4. The source of claim 1 wherein the wellbore has a depth at least equal to a longest wavelength of energy to be imparted into the Earth's subsurface.

5. The source of claim 1 wherein the resonator has a tuning device configured to maintain a resonant frequency substantially equal to an instantaneous frequency of the alternating current.

6. The source of claim 5 wherein the tuning device comprises an actuator coupled to a sleeve, the sleeve disposed over selected numbers of openings in a wall of a tube on the resonator.

7. A method for imparting acoustic energy into subsurface formations, comprising:

applying swept frequency alternating current to a transducer acoustically coupled and proximate to a tunable Helmholtz resonator;

matching a resonant frequency of the resonator to the instantaneous frequency of the alternating current; and conducting energy from the resonator into the subsurface by immersion thereof in a wellbore drilled through rock formations, the wellbore having a plurality of layers of fluid therein, each layer having at least one of a different density and viscosity than the other layers.

8. The method of claim 7 wherein the at least one of density and viscosity increases with respect to depth in the wellbore.

9. The method of claim 7 wherein the transducer comprises a piezoelectric element.

10. The method of claim 7 wherein the wellbore has a depth at least equal to a longest wavelength of energy to be imparted into the Earth's subsurface.

* * * * *